United States Patent
Santobianco et al.

(10) Patent No.: US 7,297,306 B2
(45) Date of Patent: Nov. 20, 2007

(54) CLASS OF AMINE COINITIATORS IN PHOTOINITIATED POLYMERIZATIONS

(75) Inventors: John G. Santobianco, Ocean Springs, MS (US); Chau K. Nguyen, Baton Rouge, LA (US); Charles A. Brady, Anderson, SC (US)

(73) Assignee: Albemarle Corporation, Richmond, VA (US)

( * ) Notice: Subject to any disclaimer, the term of this patent is extended or adjusted under 35 U.S.C. 154(b) by 319 days.

(21) Appl. No.: 10/511,508

(22) PCT Filed: Apr. 24, 2003

(86) PCT No.: PCT/US03/12955

§ 371 (c)(1),
(2), (4) Date: Oct. 15, 2004

(87) PCT Pub. No.: WO03/091288

PCT Pub. Date: Nov. 6, 2003

(65) Prior Publication Data

US 2005/0197420 A1    Sep. 8, 2005

Related U.S. Application Data

(60) Provisional application No. 60/375,639, filed on Apr. 26, 2002.

(51) Int. Cl.
*B32B 27/10* (2006.01)
*B32B 27/16* (2006.01)
*C08F 2/46* (2006.01)

(52) U.S. Cl. ............. 264/496; 428/511; 522/2; 522/14; 522/28; 522/103; 522/182

(58) Field of Classification Search ........... 522/173, 522/14, 2, 28, 103, 182; 428/511; 264/496
See application file for complete search history.

(56) References Cited

U.S. PATENT DOCUMENTS

| | | |
|---|---|---|
| 3,759,807 A | 9/1973 | Osborn et al. |
| 4,054,682 A | 10/1977 | Kuesters et al. |
| 4,071,424 A | 1/1978 | Dart et al. |
| 4,089,762 A | 5/1978 | Frodsham |
| 4,233,396 A | 11/1980 | Armstrong et al. |
| 4,279,721 A * | 7/1981 | Kirchmayr et al. ........ 522/14 |
| 4,297,185 A | 10/1981 | Chevreux et al. |
| 4,355,077 A | 10/1982 | Chevreux et al. |
| 4,416,826 A | 11/1983 | Neckers |
| 4,434,035 A * | 2/1984 | Eichler et al. ........ 522/16 |
| 4,498,963 A | 2/1985 | Neckers |
| 4,501,889 A | 2/1985 | Wells et al. |
| 4,666,952 A | 5/1987 | Henne et al. |
| 4,752,649 A | 6/1988 | Neckers |
| 4,831,188 A | 5/1989 | Neckers |
| 4,843,136 A | 6/1989 | Reiners et al. |
| 4,904,629 A | 2/1990 | Galla et al. |
| 4,904,750 A | 2/1990 | Reiners et al. |
| 4,948,702 A | 8/1990 | Wallbillich et al. |
| 5,091,583 A | 2/1992 | Casey et al. |
| 5,288,589 A | 2/1994 | McKeever et al. |
| 5,322,940 A | 6/1994 | Savoca et al. |
| 5,348,844 A | 9/1994 | Garmong |
| 5,387,682 A | 2/1995 | Bonham et al. |
| 5,405,731 A | 4/1995 | Chandrasekaran et al. |
| 4,071,424 A | 7/1995 | Dart et al. |
| 5,458,921 A | 10/1995 | Briguglio et al. |
| 5,496,504 A | 3/1996 | Bonham et al. |
| 5,521,229 A | 5/1996 | Lu et al. |
| 5,624,973 A | 4/1997 | Lu et al. |
| 5,837,745 A | 11/1998 | Safta et al. |
| 5,976,763 A | 11/1999 | Roberts et al. |
| 5,994,424 A | 11/1999 | Safta et al. |
| 6,127,094 A | 10/2000 | Victor et al. |
| 6,248,801 B1 | 6/2001 | Meier |
| 6,322,950 B1 | 11/2001 | Sorori et al. |

FOREIGN PATENT DOCUMENTS

| | | |
|---|---|---|
| DE | 33 31 157 A | 3/1985 |
| EP | 0 012 949 A1 | 7/1980 |
| EP | 0 197 616 A1 | 10/1986 |
| GB | 1 304 112 | 1/1973 |
| WO | WP 03/091288 A1 | 11/2003 |

OTHER PUBLICATIONS

FIRSTCURE AS-1 Amine Synergist; Albemarle Corporation, May 2002, 2 pages.
FIRSTCURE AS-1 Amine Synergist Technical Bulletin; AS-1 Compared to Amine Acrylate Adducts; Albemarle Corporation, Dec. 2002, 2 pages.
FIRSTCURE AS-1 Amine Synergist Technical Bulletin; AS-1 versus MDEA; Albemarle Corporation, Oct. 2002; 2 pages.
FIRSTCURE AS-3 Amine Synergist Technical Bulletin; AS-3 Compared to Amine Acrylate Synergist; Albemarle Corporation, Dec. 2002, 2 pages.
FIRSTCURE AS-4 Amine Synergist Technical Bulletin; AS-4 Compared to Amine Acrylate Adducts; Albemarle Corporation, Oct. 2003, 2 pages.
FIRSTCURE AS-4 Amine Synergist Technical Bulletin; AS-4 Compared to Amine Acrylate Synergist; Albemarle Corporation, Oct. 2003, 2 pages.

* cited by examiner

*Primary Examiner*—Susan Berman
(74) *Attorney, Agent, or Firm*—Jeremy J. Kliebert

(57) ABSTRACT

A new class of amines is incorporated into phtopolymerizable systems employing type I or type II photoinitiators. These amines are trialkylamines having a total of 10 to about 36 carbon atoms in the molecule and wherein at least one alkyl group has a chain length of at least 8 carbon atoms. Preferably, one or two of the alkyl groups are methyl or ethyl or one of each. Short chain amines as defined herein provide synergistic results when used with such trialkylamines.

23 Claims, No Drawings

CLASS OF AMINE COINITIATORS IN PHOTOINITIATED POLYMERIZATIONS

This application is a National filing of PCT/US03/12955, filed Apr. 24, 2003, which claims benefit of provisional application 60/375,639, filed Apr. 26, 2002.

Free-radical photoinitiators are typed into two classes: Type I, those that undergo photocleavage to yield free-radicals and Type II, those that produce initiating radicals through an abstraction process. Type I photoinitiators produce radicals through a unimolecular fragmentation. Examples of these include aromatic carbonyl compounds, such as derivatives of benzoin, benzilketal and acetophenone. One example is 2,2-dimethoxy-2-phenylacetophenone (DMPA), the reaction pathways of which are as follows:

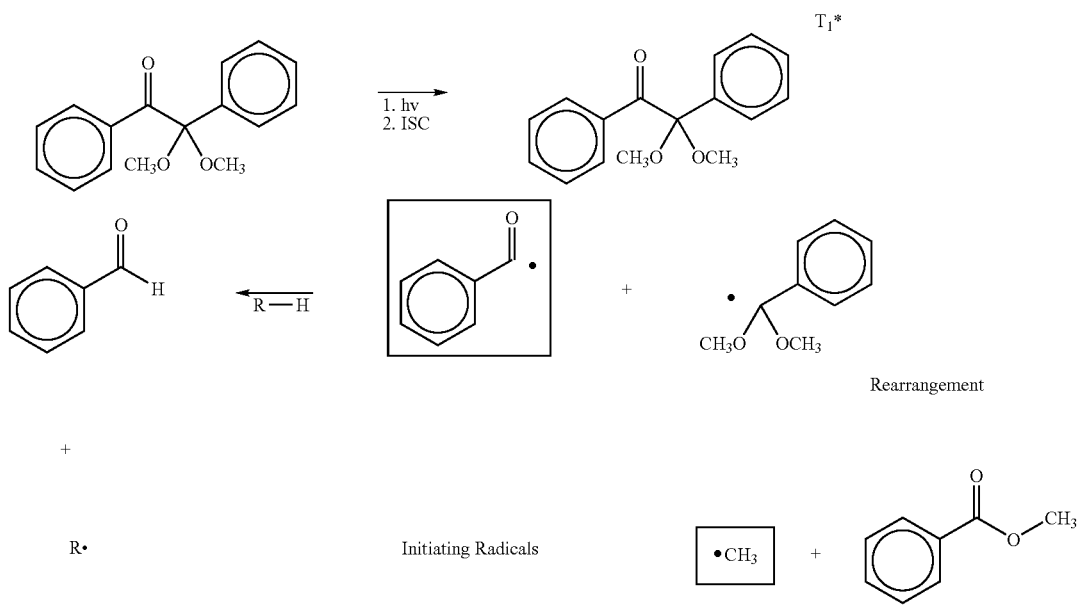

BACKGROUND

In light cured applications utilizing Type II photoinitiators (hydrogen abstraction), low molecular weight amines are typically incorporated as a coinitiator. These small molecule amines are not always fully reacted and can remain in the final cured matrix, which pose complications such as residual extractables and leachables.

Using light to cure coatings comes with motivations such as environmental compliance, fast cure, improved physical properties and lower applied cost. These motivators translate into benefits of reduced solvent emissions, increased product speed/productivity, product performance, efficiency and cost effectiveness. The use of UV-EB has enjoyed a growth rate of approximately 10% per annum over the last decade and equates to an annual industrial usage of about 100,000,000 lbs. Nevertheless, some obstacles include cost of products, equipment cost, poor weatherability, adhesion and curing of thick samples and residual uncured materials. While many of these issues are successfully being addressed, unsolved problems and deterrents still exist.

A UV curable formulation can contain several fundamental components, of which can be monomers, functionalized oligomers, and photoinitiators (free-radical or cationic). Among additional components which can also be included are, for example, pigments, dyes, light stabilizers, radical scavengers and adhesion promoters.

Upon irradiation DMPA cleavage occurs by generating the benzyl radical and a dimethoxy substituted carbon centered radical. The dimethoxy radical rearranges to form a methyl radical and methylbenzoate. The benzyl radical can initiate polymerization or abstract hydrogens forming benzaldehyde. Unreacted residual DMPA and other small molecules remain in the final polymer matrix and can be readily extracted and leached. This makes these coatings unfit for applications that involve contact with food, notably an emerging application. Residual DMPA can also further react leading to premature degradation of the polymer. These materials then cannot be used for outdoor applications where exposure to intense UV would be expected.

Thus while Type I photoinitiators typically provide high rates of initiation, yielding rapid controllable rates of polymerization and fast curing line speeds, Type I systems are often expensive and can produce toxic by-products.

Type II (abstraction type) photoinitiators are typically aromatic ketones, such as thioxanthone and benzophenone derivatives. In these systems, a coinitiator must be present in order to produce an initiating radical. These coinitiators can include amines, alcohols or ethers. The process of producing radicals is either through a hydrogen abstraction or an electron transfer mechanism depending on the coinitiator. The primary initiating radical is usually a radical centered on the coinitiator. In the presence of abstractable hydrogens (such as amine, ether, thiol or alcohol) the reaction produces two radicals. The reaction pathway may be depicted as follows:

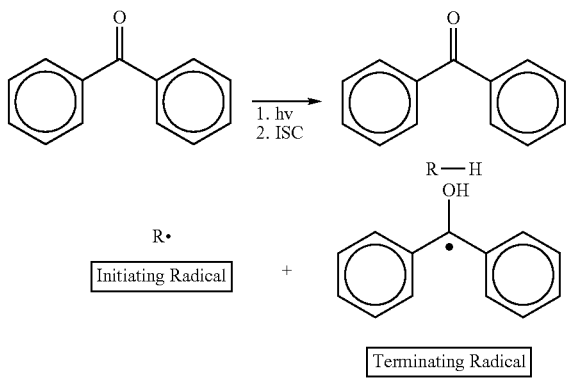

When the hydrogen donor source is an amine, the excited state benzophenone participates in an electron transfer process forming the radical-anion/radical-cation pair. This is subsequently followed by a rapid proton-transfer from a carbon alpha to the nitrogen on the amine (aminyl radical) to the benzophenone radical-anion producing the semipinacol ketyl type radical and a carbon centered radical on the amine. The semipinacol ketyl type radical is not efficient at initiating polymerization, whereas the aminyl radical readily initiates polymerization. The products from the semipinacol ketyl type radical are still photoactive and can lead to photosensitivity of the final film.

In light cured applications utilizing Type II photoinitiators (hydrogen abstraction), tertiary amines are typically incorporated as a coinitiator, due to their reactivity with type II photoinitiators. Amine synergists can be placed in three categories: amine acrylates, amine acrylate adducts, and free-amines (ethanolamines).

Amine acrylates are made by the reaction of an amine and a multifunctional acrylate in such a ratio as to produce an oligomeric compound. Amine acrylates do not blush or discolor sensitive pigments, but are costly, can cause skin burns, have high viscosity, and must be used in the range of 12-20 wt % to be effective.

Amine acrylate adducts are formed from reacting secondary amines with an acrylate monomer. The amount of amine functionality is controlled by the ratio of amine to acrylate. The amine acrylate adducts give good cure, do not blush and contribute to overcoming the effects of oxygen inhibition, but discolor sensitive pigments, can cause skin burns, and must be used in the range of 8-12 wt % to be effective.

Free-amines (ethanolamines), which are low in cost, effective in the range of 4-6 wt %, and give good through cure as well as contribute to overcoming the effects of oxygen inhibition. However, these blush in high humidity, discolor sensitive pigments such as rhodamine red and reflex blue in over print varnishes, are extractable, and contribute to odors due to high vapor pressures. Examples of low molecular weight amines typically used as a coinitiators are N-methyl-N,N-diethanolamine, triethanolamine, triethylamine, triisopropanolamine, and N-methyldibutylamine. These small molecule amines are not always fully reacted and can remain in the final cured matrix, which pose complications such as residual extractables and leachables.

Accordingly, when forming films using Type II photoinitiators, especially thin films of about 2 mils or less, a need exists for a way of eliminating or minimizing (i) extractables in the films, (ii) discoloration of the films, and (iii) premature degradation of the films, while at the same time achieving rapid cures. It would be especially advantageous if not only films but other articles as well could be fabricated by photopolymerization using Type I or Type II initiators, or both, without increasing extractables, blushing, discoloration or degradation of the resultant article or product.

THE INVENTION

Pursuant to this invention, a new class of amines is incorporated into photopolymerizable systems employing Type I or Type II photoinitiators, or a combination of both such types. In the case of systems based on Type II photoinitiators the amines used pursuant to this invention offset the deleterious effects of conventional small molecule amines without compromising cure speed performance. Indeed, in films of about 2 mils or less, super-fast cures can be accomplished eliminating or minimizing (i) extractables in the films, (ii) discoloration of the films, and (iii) premature degradation of the films. The amines used pursuant to this invention also have low extractables, low viscosity, and low use concentrations. In systems based on use of Type I photoinitiators, extractables are not increased and moreover, blushing, discoloration and premature degradation of the polymer can be minimized by use of the amine coinitiators of this invention.

The amines used in the practice of this invention are one or more trialkylamines each having a total of 10 to about 36 carbon atoms in the molecule and wherein at least one alkyl group has a chain length of at least 8 carbon atoms. Preferred amines are (A) one or more trialkyl amines each having a total of 10 to about 24 carbon atoms in the molecule, and wherein two of the alkyl groups are methyl or ethyl, or one of each, (more preferably both are methyl), and the remaining alkyl group contains at least 8 carbon atoms (and more preferably is a primary alkyl group containing in the range of 8 to about 22 carbon atoms), or (B) one or more trialkyl amines each having a total of 17 to about 38 carbon atoms in the molecule, and wherein one of the alkyl groups is methyl or ethyl(preferably methyl), and the other two alkyl groups are the same or different, and each is a primary alkyl group). Particularly preferred amines from the cost-effectiveness standpoint are octyldimethylamine, decyldimethylamine, dodecyldimethylamine, tetradecyldimethylamine, hexadecyldimethylamine, octadecyldimethylamine, didecylmethylamine, and dodecylmethylamine.

Another aspect of this invention is the discovery that certain short chain amines when used in combination with the above long chain trialkylamines behave synergistically, or at least provide improved results as compared to the long chain trialkylamine in the absence of the short chain amine. For example, the combination of a short chain amine in the form of, e.g., N-[3-(dimethylamino)propyl]-N,N',N'-trimethyl-1,3-propanediamine (Polycat 77; Air Products, Inc.), or 2,2'-oxybis[N,N-dimethylethanamine](DABCO BL-19; Air Products, Inc.), or preferably N,N-dimethyl-4-morpholineethanamine (DABCO XDM; Air Products, Inc.), when used in combination with the above long chain trialkylamines and 2-hydroxy-2-methyl-1-phenylpropane-1-one, provide synergistic results. N,N-dimethyl-4-morpholineethanamine, when used in combination with dodecyldimethylamine and 2-hydroxy-2-methyl-1-phenylpropane-1-one, has been shown to be effective at a lower percentage as compared to methyldiethanolamine.

The "short chain amines" are tertiary amino compounds containing at least two electronegative atoms in the molecule, at least one of which is a tertiary nitrogen atom and another of which is an oxygen atom or a tertiary nitrogen atom, and wherein the electronegative atoms are bonded only to short chain alkyl or alkylene groups (e.g., $C_{1-3}$ alkyl or alkylene groups), and wherein the compound has a total of at least 4 and preferably at least 6 abstractable hydrogen atoms in positions alpha to at least some of the electronegative atoms in the compound. To illustrate, N-[3-(dimethylamino)propyl]-N,N',N'-trimethyl-1,3-propanediamine has three electronegative atoms and a total of 9 abstractable hydrogen atoms in the molecule. 2,2'-Oxybis[N,N-dimethylethanamine] has three electronegative atoms and a total of 8 abstractable hydrogen atoms in the molecule. N,N-dimethyl-2-morpholinoethanamine has two electronegative atoms and a total of 8 abstractable hydrogen atoms in the molecule. N-Hydroxyethylmorpholine has two electronegative atoms and a total of 6 abstractable hydrogen atoms in the molecule. A short chain amine having the requisite number of abstractable hydrogen atoms will cause polymerization to occur when used with benzophenone in a mixture with epoxyacrylate diluted with tripropylene glycol diacrylate in a 35:65 wt ratio on exposure of the mixture UW light at 254 nonometers. The forgoing illustrative short chain amines make clear that the short chain alkylene groups can be part of a non-cyclic compound or of a cyclic compound. Thus for example in N-[3-(dimethylamino)propyl]-N,N', N'-trimethyl-1,3-propanediamine, the alkylene group (the propane moiety) is in a non-cyclic compound. In contrast, in N-hydroxyethylmorpholine there are two alkylene (ethylene) groups in the morpholine moiety, which groups form a cyclic morpholine ring with an oxygen atom and a nitrogen atom, as well as an open chain alkylene group (the ethyl moiety in the N-hydroxyethyl group).

Among the various types of suitable short chain tertiary amino compounds are compounds represented by the formula:

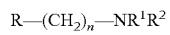

where
A) R is (i) a dialkylamino group in which each alkyl is, independently, a $C_{1-3}$ primary alkyl group; (ii) an N-alkylpiperazinyl group in which the alkyl is a $C_{1-3}$ primary alkyl group, or (iii) a morpholino group;
   $R^1$ is a dialkylamino group in which each alkyl is, independently, a $C_{1-3}$ primary alkyl group;
   $R^2$ is (i) a dialkylamino group in which each alkyl is, independently, a $C_{1-3}$ primary alkyl group; (ii) an alkyleneamino group in which alkylene is a $C_{1-3}$ alkylene group and the amino is a dialkylamino group in which each alkyl is, independently, a $C_{1-3}$ primary alkyl group; (iii) an alkyleneaminoalkyleneamino group (—R—N(R)—R—NR$_2$) in which each alkylene is, independently, a $C_{1-3}$ alkylene group, the amino between the alkylenes is a $C_{1-3}$ primary alkylamino group, and the other amino is a dialkylamino group in which each alkyl is, independently, a $C_{1-3}$ primary alkyl group; (iv) an alkyleneoxyalkyleneamino group (—R—O—R—NR$_2$) in which each alkylene is, independently, a $C_{1-3}$ alkylene group, and the amino is a dialkylamino group in which each alkyl is, independently, a $C_{1-3}$ primary alkyl group; or (v) an alkyleneoxyalkyleneoxyalkyleneamino group (—R—O—R—O—R—NR$_2$) in which each alkylene is, independently, a $C_{1-3}$ alkylene group, and the amino is a dialkylamino group in which each alkyl is, independently, a $C_{1-3}$ primary alkyl group;

or where
B) R is (i) a dialkylamino group in which each alkyl is, independently, a $C_{1-3}$ primary alkyl group; (ii) an N-alkylpiperazinyl group in which the alkyl is a $C_{1-3}$ primary alkyl group, or (iii) a morpholino group; and $R^1$ and $R^2$ taken together is (i) an N-alkylpiperazinyl group in which the alkyl is a $C_{1-3}$ primary alkyl group, or (ii) a morpholino group.

In addition to the above, many other types of short chain amines can be used pursuant to this invention. In general, the compound will typically consist of one or more tertiary amino groups, one or more ether oxygen atoms, and/or one or two hydroxyl groups linked to each other by $C_{1-3}$ aklylene groups, such that there are at least two tertiary amino groups or at least one tertiary amino group and at least one ether oxygen atom or at least one hydroxyl group linked together in this fashion, and such that the compound has a total of at least 4 and preferably at least 6 abstractable hydrogen atoms in positions alpha to at least some of the electronegative atoms in the compound. The tertiary amino group(s) when not part of a cycloaliphatic ring system are di($C_{1-3}$ alkyl) amino or mono($C_{1-3}$ alkyl)amino group(s) depending on whether the tertiary amino group is a terminal group or an internal group.

A few non-limiting examples of suitable short chain amines include N,N,N'-trimethyl-1,2-ethanediamine, N,N, N',N'-tetramethyl-1,2-ethanediamine, N,N,N'-trimethyl-1,3-propanediamine, N,N,N',N'-tetramethyl-1,3-propanediamine, N-[2-(dimethylamino)ethyl]-N,N',N'-trimethyl-1,2-ethanediamine, N-[3-(dimethylamino)propyl]-N,N',N'-trimethyl-1,3-propanediamine, 1,4-dimethylpiperazine, 2,2'-oxybis[N,N-dimethylethanamine], 3,3'-oxybis[N,N-dimethylpropanamine], 4-[2-(dimethylamino)ethyl] morpholine (a.k.a. N,N-dimethyl-2-morpholinoethanamine), 4-[3-(dimethylamino)propyl] morpholine, and the homologs of the foregoing amines in which some or all of the methyl groups are replaced by ethyl or propylgroups, triethylenediamine, 4,4'-(oxydi-2,1-ethanediyl)bismorpholine, N-hydroxyethylmorpholine, and N-hydroxypropylmorpholine.

In the photopolymerization of monomer or oligomer, films having a thickness of about 2 mils or less, such as in the manufacture of thinly-coated papers or thin high grade card or paperboard stock for use in magazine covers, brochures, corporate annual reports, folders, and the like in coating systems operating at high linear speeds, exposure times must be extremely short. Such thin photopolymerizable monomer or oligomer coating films are typically applied to paper webs travelling at speeds of about 10 feet per second and thus the photopolymerization exposure time of such coated webs travelling at such speeds can be in the range of as little as about 0.005 to 0.02 second. Thus the amine coinitiators used pursuant to this invention must function extremely rapidly while at the same time becoming fixed within the polymerized coating without discoloration and without undergoing or causing other types of degradation within the thin film.

An advantageous feature of such concurrent production and in situ application or bonding of such thin photopolymerized coatings on a travelling paper or thin paperboard or card stock is that no other operations such as washing or drying are required. Indeed, it is preferable to conduct the concurrent production and in situ application or bonding of not only such thin photopolymerized coatings on a travelling paper or thin paperboard or card stock, but also the production of other articles, coatings, or laminates without use of washing or drying steps. In short the finished articles of this invention are produced with a minimum of steps. All that is required is to place the photopolymerizable composition in the proper place and configuration to be photopolymerized and expose the resultant article to sufficient radiation to effect the in situ photopolymerization. Printed matter, decorations, or the like may thereafter be applied to the photopolymerized article, coating, or laminate using conventional techniques, if desired.

The photopolymerized compositions of this invention can themselves constitute photopolymerizable inks or coatings applied as printed, decorative, or pictorial matter on a substrate and then photopolymerized in place. In this embodiment of the invention the photopolymerizable composition will include one or more pigments, dyes, or other color-producing substances so that permanent printed matter is formed upon exposure of the resultant article to radiation to effect photopolymerization.

Photopolymerizable monomers for use in the practice of this invention include acrylates, methacrylates, and the like. Non-limiting examples of such acrylate and methacrylate monomers and oligomers include methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, cyclohexyl acrylate, cyclohexyl methacrylate, isobornyl acrylate, isobornyl methacrylate, hydroxyethyl acrylate, hydroxyethyl methacrylate, dimethylaminopropyl acrylate, dimethylaminopropyl methacrylate, diethylaminopropyl acrylate, diethylaminopropyl methacrylate, and the like, as well as mixtures of any two or more thereof.

Polyfunctional monomers and oligomers, i.e., compounds or oligomers having more than one alpha-beta-ethylenic site of unsaturation, can also be used in the practice of this invention. Non-limiting examples of such substances include ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, dipropylene glycol diacrylate, dipropylene glycol dimethacrylate, tripropylene glycol diacrylate, tripropylene glycol dimethacrylate, trimethylolpropane triacrylate, trimethylolpropane trimethacrylate, glycerol diacrylate, glycerol dimethacrylate, aliphatic urethane diacrylate, aliphatic urethane dimethacrylate, aliphatic urethane triacrylate, aliphatic urethane hexaacrylate, aromatic urethane diacrylate, aromatic urethane dimethacrylate, aromatic urethane triacrylate, polyethylene glycol (400) diacrylate, polyethylene glycol (400)dimethacrylate, polyethylene glycol (600) diacrylate, polyethylene glycol (600)dimethacrylate, ethoxylated neopentylglycol diacrylate, ethoxylated neopentylglycol dimethacrylate, propoxylated neopentyl glycol diacrylate, propoxylated neopentyl glycol dimethacrylate, highly ethoxylated trimethylolpropane triacrylate, highly ethoxylated trimethylolpropane trimethacrylate, ethoxylated bisphenol A diacrylate, ethoxylated bisphenol A dimethacrylate, erythritol tetraacrylate, erythritol tetramethacrylate, amino-modified epoxy diacrylate, epoxy novolac triacrylate, divinylbenzene, 1,3-diisopropenylbenzene, polyester triacrylate, polyester tetraacrylate, polyester hexaacrylate, and diluted acrylic acrylate oligomers such as Ebecryl® 740-40TP, Ebecryl® 745, Ebecryl® 754, Ebecryl® 1701, Ebecryl® 1701-TP20, and Ebecryl® 1710 (all from UCB Chemicals Corporation), and the like, as well as mixtures of any two or more thereof.

If desired, alpha,beta-ethylenically unsaturated carboxylic acids can be used in conjunction with acrylate and/or methacrylate monomers, typically for the purpose of providing improved adhesion to certain substrates. Examples of such acids include methacrylic acid, acrylic acid, itaconic acid, maleic acid, beta-carboxyethyl acrylate, beta-carboxyethyl methacrylate, and the like, as well as mixtures of any two or more thereof. Preferred composition of this invention are, however, devoid of such carboxylic acids except as may be present as impurities or as residuals from manufacture.

Preferred photopolymerizable monomers for use in the practice of this invention include tripropylene glycol diacrylate, trimethylol propane tetraacrylate, ethoxylated trimethylol propane tetraacrylate, propoxylated neopentyl glycol diacrylate, hexanediol diacrylate, and the like, as well as mixtures of any two or more thereof.

Compositions of this invention to be subjected to photopolymerization typically contain in the range of about 0.5 to about 85 wt % of one or more photopolymerizable monomers such as those described above. Preferred compositions of this invention contain in the range of about 20 to about 75 wt % of one or more of such photopolymerizable monomers. Selections within these ranges are typically made for effecting adjustments of viscosity to suit the particular application method to be used. More preferred photopolymerizable compositions, especially those adapted for use in forming low viscosity web coatings, contain in the range of about 50 to about 70 wt % of one or more such monomers, based on the weight of the total composition to be subjected to photopolymerization.

Various photoinitiators can be used in the practice of this invention. Suitable initiators for such use include hydrogen Type I (unimolecular fragmentation type) initiators, such as alpha-diketone compounds or monoketal derivatives thereof (e.g., diacetyl, benzil, benzyl, or dimethylketal derivatives); acyloins (e.g., benzoin, pivaloin, etc.); acyloin ethers (e.g., benzoin methyl ether, benzoin ethyl ether, benzoin propyl ether, etc.), acyl phosphine oxides, and other similar Type I initiators, including mixtures of any two or more such initiators. Similarly, Type II (abstraction-type) initiators can be used. Non-limiting examples of suitable Type II initiators include xanthone, thioxanthone, 2-chloroxanthone, benzil, benzophenone, 4,4'-bis(N,N'-dimethylamino)benzophenone, polynuclear quinones (e.g., 9,10-anthraquinone, 9,10-phenanthrenequinone, 2-ethyl anthraquinone, and 1,4-naphthoquinone), or the like, as well as mixtures of any two or more thereof. Preferred Type I initiators include ketals such as benzyl dimethyl ketal. Preferred Type II initiators include hydrogen quinones such as benzoquinone and 2-ethyl anthraquinone. Mixtures of Type I and Type II initiators can also be used. The initiator or mixture of initiators is typically added in an amount of 0.01 to 10 parts by weight, preferably 0.05 to 5 parts by weight, per 100 parts by weight of the monomer(s) to be photopolymerized.

In effecting photopolymerization pursuant to this invention either coherent or non-coherent radiation can be employed. Various sources of such radiation can be employed, such as an ion gas laser (e.g., an argon ion laser, a krypton laser, a helium:cadmium laser, or the like), a solid state laser (e.g., a frequency-doubled Nd:YAG laser), a semiconductor diode laser, an arc lamp (e.g., a medium pressure mercury lamp, a Xenon lamp, or a carbon arc lamp), and like radiation sources. Exposure sources capable of providing ultraviolet and visible wavelength radiation (with wavelengths typically falling in the range of 300-700 nm) can also be used for the practice of the present invention. Preferred wavelengths are those which correspond to the spectral sensitivity of the initiator being employed. Preferred radiation sources are gas discharge lamps using vapors of mercury, argon, gallium, or iron salts and utilizing magnetic, microwave or electronic ballast; such lamps commonly are medium pressure mercury lamps, or lamps made by Fusion Systems (i.e., D, H, and V lamps).

Exposure times can vary depending upon the radiation source, and photoinitiator(s) being used. For preferred high speed applications such as in forming thin coatings on paper webs travelling at high linear speeds, times in the range of about 0.005 to about 0.015 second are preferred. In photopolymerization operations in which the mixture being polymerized is either stationary or moving slowly as on a conveyor belt, longer exposure times (e.g., in the range of about 0.2 to about 0.4 second can be used.

Pigments and dyes can be used, and often are preferably used, in the photopolymerizable compositions of this invention. Non-limiting examples of pigments and typical amounts used in the formulation include phthalocyanine blue (5 to 20 wt %), titanium dioxide (10 to 30 wt %), or other organic or inorganic pigments employed in the art. Optionally, dyes such as nigrosine black or methylene blue may be used to enhance color or tone (1 to 5 wt %).

Light stabilizers are another type of additives which can be, and preferably are, used in the photopolymerizable compositions of this invention. Non-limiting examples of such light stabilizers include 2-hydroxybenzophenones such as 2,2'-dihydroxy-4,4'-dimethoxylbenzophenone, 2-(2-hydroxyphenyl)benzotriazoles such as 2-(2'-hydroxyphenyl) benzotriazole, sterically-hindered amines such as bis(2,2,6, 6-tetramethyl-4-piperidyl)sebacate or bis(2,2,6,6-tetramethyl-4-piperidyl)succinate, oxamides such as 4,4'-dioctyloxyanilide, acrylates such as ethyl α-cyano-β,β-diphenylacrylate or methyl α-carbomethoxycinnanamate, and nickel complexes such as the nickel complex of 2,2'-thiobis[(1,1,3,3-tetramethylbutyl)phenol. Typically the amount used will be in the range of about 0.02 to about 5 wt % depending upon the particular type of light stabilizer employed.

Still another type of additives which can be used, and in preferred embodiments is used, in forming the photopolymerizable compositions of this invention is one or more radical scavengers. Non-limiting examples of suitable radical scavengers for such use include hydroquinone, hydroquinone methyl ether, p-tert-butylcatechol, quinoid compounds such as benzoquinone and alkyl-substituted benzoquinones, as well as other radical scavenger compounds known in the art. Typically these components will be used in amounts in the range of about 100 ppm to about 2 percent by weight of the composition.

Adhesion promoters constitute yet another type of additive components which can be used in the formation of the photopolymerizable compositions of this invention. Such components typically are silane derivatives such as gamma-aminopropyltriethoxysilane (DOW A-1100) and equivalent substituted silane products; acid functionally-substituted resins; oligomers or monomers, such as partial esters of phosphoric acid, maleic anhydride, or phthalic anhydride, with or without acrylic or methacrylic unsaturation; and dimers and trimers of acrylic/methacrylic acid. If adhesion promoters are used, the preferred types are other than alpha,beta-ethylenically unsaturated carboxylic acids. If and when used, the concentration thereof is determined emperically by adhesion tests. In general, however, amounts are often in the range of about 0.5 to about 20 wt %, and in more preferred cases in the range of about 2 to about 10 wt % of the total weight of the composition.

Among preferred photopolymerizable compositions of this invention are those in which the composition is comprised of:
a) at least one photopolymerizable monomer,
b) at least one photopolymerization initiator,
c) at least one long chain alkylamine, and additionally at least one, preferably at least two, more preferably at least three, and most preferably all four of d) through g) as follows:
d) at least one pigment,
e) at least one dye,
f) at least one light stabilizer,
g) at least one radical scavenger, and optionally at least one adhesion promoter which preferably is other than one or more alpha,beta-ethylenically unsaturated carboxylic acids. The preferred amounts of these components in these preferred photopolymerizable compositions are as given above.

There are various ways of conducting photopolymerizations pursuant to this invention. For example, a photopolymerizable composition of this invention can be photopolymerized as a thin coating on a travelling web. Alternatively, the photopolymerizable composition can be photopolymerized as an a coating or laminate on a substrate. Another variant is where the photopolymerizable composition is photopolymerized as an article or shape while in a mold. In these and other modes of operation, the exposure to radiation for effecting photopolymerization can be continuous or intermittent.

Various photopolymerized compositions, articles and shapes can be produced by use of this invention. Thus the photopolymerized end product can be printed matter on a substrate such as paper, cardboard, or plastic film, etc.; manufactured articles such as handles, knobs, inkstand bases, small trays, rulers, etc.; and coatings or laminates on substrates such as plywood, metal sheeting, polymercomposite sheeting, etc. As noted above, thin coated paper and coated card or thin paperboard stock where the coatings are up to about 2 mils in thickness constitute preferred articles produced pursuant to this invention.

Preferred applications for the process technology of this invention include the following:
preparation of thin paper coatings (e.g., 3 to 10 microns) over print or film, applied by gravure, flexo, rod, or offset press;
use as coatings and/or inks (e.g., 15 to 35 microns) applied by roller coater or curtain coater over flooring (e.g., vinyl sheet goods) or wood panels; and
use as coatings and/or inks (e.g., 10 to 20 microns) applied by flat bed or rotary screen print for labels and packages.

The following non-limiting Examples illustrate this invention.

For Example 1, long chain alkylamines dodecyldimethylamine (ADMA® 12 amine), hexadecyldimethylamine (ADMA® 16 amine), octadecyldimethylamine (ADMA® 18 amine), and didecylmethyl amine (DAMA® 1010 amine) were obtained from Albemarle Corporation. Benzophenone and N-methyl-N,N-diethanolamine (MDEA) were obtained from Aldrich Chemical Company, both were used without further purification. 1,6-Hexanediol diacrylate (HDDA), dipropylene glycol diacrylate (DPGDA), tripropylene glycol diacrylate (TPGDA), trimethylolpropane triacrylate (TMPTA) and Ebecryl® 4833 aliphatic urethane acrylate were obtained from UCB Chemicals Corporation. The latter product as supplied is diluted with 10% of N-vinyl-2-pyrrolidone.

Line cure experiments were conducted on a Fusion UV Systems conveyer belt system with an intensity of 495 mJ cm$^{-2}$ from a Fusion D-bulb at 52 ft min$^{-1}$. Samples were applied via a draw-down bar with a thickness of 7 wet mils on Q-Panels of cold rolled steel. Samples were then passed under the UV light on the conveyer and cure determined by thumb twist test.

EXAMPLE 1

Photo-DSC Experiments

The evaluation of long chain alkylamine coinitiators of this invention was performed in comparison to MDEA incorporated as a coinitiator. These photo-DSC experiments were performed on a Perkin-Elmer DSC 7 modified to incorporate a medium pressure mercury lamp from Ace Glass. The light is passed through the DSC sample head through two quartz windows to allow for the irradiation onto the sample and reference cells. The intensity was 30 mW cm$^{-2}$. 2 µL samples were introduced into specially crimped aluminum DSC pans with thicknesses in the range of 180-250 µm. Photo-DSC exotherms were acquired by Perkin-Elmer Pyris software and further manipulation of data and plotting was performed using standard spreadsheet programs. Representative photo-DSC data for HDDA formulations initiated by benzophenone in the presence of an amine synergist are summarized in Tables 1 and 2. Light intensity in the runs in Table I was 67.2 mW/cm$^2$ at full arc under N$_2$ purge. It was determined by photo-DSC that the three long chain alkyldimethylamines performed efficiently when incorporated as an amine synergist compared to 1.0% by weight of N-methyl-N,N-diethanolamine (MDEA) (8.4× 10$^{-2}$ M) on an equal molar basis, each with 1.42% by weight of benzophenone (BP) to initiate the polymerization of 1,6-hexanediol diacrylate (HDDA). As shown in Table 1, the resultant polymerization exotherm data on the three long chain alkyldimethylamines with benzophenone initiator are comparable to the exotherm obtained when using MDEA with benzophenone. Table 2 compares the data on initiation of HDDA polymerization when using didecylmethyl amine (DAMA® 1010 amine) in place of MDEA on an equal molar basis. In these runs the DAMA 1010 amine concentration was set to be equal to 1.0% by weight of MDEA (8.4×10$^{-2}$ M), and the light intensity was 1.43 mW cm$^{-2}$ in N$_2$ at 365 nm. The polymerization exotherm shows that the combination of DAMA® 1010 amine with benzophenone gives a comparable exotherm to that obtained using benzophenone and MDEA.

TABLE 1

| Sample | Average Photo-DSC Exotherm (mW) |
| --- | --- |
| BP/MDEA | 70 |
| BP/ADMA 16 amine | 71 |
| BP/ADMA 12 amine | 67 |
| BP/ADMA 18 amine | 65 |

TABLE 2

| Sample | Average Photo-DSC Exotherm (mW) |
| --- | --- |
| BP/MDEA | 24 |
| BP/DAMA 1010 amine | 36 |

EXAMPLE 2

Synergistic Amine Blends

As noted earlier, certain short chain amines have been shown to provide synergistic results in blends of this invention. In order to test the synergistic behavior of certain short chain amines when used in combination with long chain trialkylamines, pre-blends were prepared in the following way and comparatively tested with a blend of long chain amines only.

Pre-Blend 1:
70% Dodecyldimethylamine (ADMA® 12 amine; Albemarle Corporation)
30% N,N-dimethyl-4-morpholineethanamine (DABCO® XDM; Air Products, Inc.)

Pre-Blend 2:
63% Dodecyldimethylamine (ADMA® 12 amine; Albemarle Corporation)
23% N,N-dimethyl-4-morpholineethanamine (DABCO® XDM; Air Products, Inc.)
10% HMPP [2-hydroxy-2-methyl-1-phenylpropane-1-one, a cleavage type photoinitiator (FirstCure® photoinitiator; Albemarle Corporation)]

Pre-Blend 3:
90% Dodecyldimethylamine (ADMA® 12 amine; Albemarle Corporation)
10% HMPP [2-hydroxy-2-methyl-1-phenylpropane-1-one, a cleavage type photoinitiator (FirstCure® photoinitiator; Albemarle Corporation)]

Base Pre-Blend:
69.65% Ebecryl 3720TP25 (i.e., an epoxy diacrylate (from UCB Chemicals))
21.04% eoTMPTA (i.e., ethoxylated trimethylolpropane triacrylate also a diluent monomer (from UCB Chemicals))
8.42% BZP (i.e., benzophenone a hydrogen abstraction photoinitiator (from Aldrich))
0.70% DC 57 (i.e., a silicone surfactant for flow/slip properties (from Dow Corning))
0.14% FC 430 (i.e., a fluorosurfactant for wetting (from 3M))
0.05% MEHQ (i.e., the methylether of hydroquinone, a radical scavenger (from Aldrich))
TPGDA Tripropyleneglycol diacrylate, a diluent monomer (UCB Chemicals)

Test blends, labeled X and A-H, which represent combinations of thepre-blends and TPGDA, along with test results for the MEK Double Rub Test for each test blend are shown in Table 3.

TABLE 3

| Ingredient (in gms) | Test Blends | | | | | | | | |
| --- | --- | --- | --- | --- | --- | --- | --- | --- | --- |
|  | X | A | B | C | D | E | F | G | H |
| Blend 1 |  | 0.6 | 0.8 | 1 | 1.2 |  |  |  |  |
| Blend 2 |  | — | — | — | — | 0.7 | 0.9 | 1.1 | 1.3 |
| Blend 3 | 1 |  |  |  |  |  |  |  |  |
| Base Blend | 16.9 | 16.9 | 16.9 | 16.9 | 16.9 | 16.9 | 16.9 | 16.9 | 16.9 |

TABLE 3-continued

| Ingredient (in gms) | Test Blends | | | | | | | |
|---|---|---|---|---|---|---|---|---|
| | X | A | B | C | D | E | F | G | H |
| TPGDA | 2.1 | 2.5 | 2.3 | 2.1 | 1.9 | 2.4 | 2.2 | 2 | 1.8 |
| MEK Double Rub Test (nos. of rubs) | 20 | 25 | 27 | 27 | 20 | 28 | 26 | 23 | 20 |

The curing of formulations employed a Fusion Systems UV Conveyor system using an H lamp at 145 fpm speed and dose of 195 mj/cm$^2$. Coatings of the test blends were applied at 5 microns using a wire wound rod over a coated paper chart (i.e., a Leneta chart). The MEK Double Rub Test results indicate how many "double rubs" it took to break through the coating material, and show that test blends containing the combination of long chain amine and short chain amine were typically far superior to the long chain amine without the presence of a short chain amine. The additional presence of HMPP further enhanced the performance of the combination of long chain amine and short chain amine under the MEK Double Rub Test.

EXAMPLE 3

A series of performance tests of various photocuring formulations was performed. The monomers used, TMPEOTA and TRPGDA, were obtained from UCB Chemicals Corporation. Methyldiethanolamine (MDEA), benzophenone (BP) and hydroquinone monomethyl ether (MEHQ) were obtained from Aldrich and used without further purification. DC-57 and FC-430 were obtained from Dow Corning and 3M. All formulations were mixed and allowed to set for 24 hours, at which point viscosity was measured. Viscosities of the formulations were performed at 25° C. with a Brookfield LV viscometer using a #2 spindle at 100 rpm. The formulations were then applied to Leneta charts (Form 5C) using a No. 3 wire wound rod, and cured under a Fusion H lamp at 145 fpm (35 mJ cm$^{-2}$ of UVC). The formulations are as listed in Table 4 below; all values given (except viscosity) are in weight percent. Abbreviations are the same as in the preceding Examples.

In order to determine the effective concentration of the FirstCure AS amine synergist, each AS was incorporated at concentrations from 1.0% to 3.0%, with the maximum cure determined by MEK double rubs. The concentration of each of the FirstCure AS Series was varied in the test formula (ranging from 1.0% to 3.0%) and results are shown below in Table 5. From the results, it was determined that AS-1 was most effective at 2.5%, with AS-3 at 2.0%. Thus, these concentrations of AS were chosen for use as a comparison to the traditional amine synergists.

The final cured films were then evaluated for the following performance parameters:

1. Blush resistance was determined by placing freshly cured draw downs in a chamber at 95% relative humidity and 95° F. for 24 hours and visually examined for degree of blushing over the black section of the chart.
2. Pigment discoloration was evaluated by making proofs with Reflex Blue and Rhodamine Red on a Little Joe® press using offset sheet fed inks applied to SBS board. The proofs were allowed to dry until unmarred by a thumb twist, then over coated with the UV coatings and cured at 145 fpm. The freshly cured proofs were placed between glass plates and the edges were sealed with tape to simulate conditions in a stack. The plates were then placed in a 50° C. circulating air oven for 72 hours and rated visually for discoloration; an uncoated proof was treated similarly as a control.
3. Methylethylketone (MEK) double rubs were measured 3 min. after exposure; solvent resistance was determined by ASTM D5402-93.
4. Yellowness index (YID) was measured using a BYK-Gardner colorimeter.
5. Gloss was determined at 60° C. using a BYK-Gardner Tri-Gloss meter.
6. Extractions were performed for 10 hours by MEK in a Soxhlet extractor on films cured at 75 fpm with a Fusion H bulb.

Results of the tests performed are summarized in Table 5.

TABLE 4

| Formulation component | Synergist | FIRSTCURE AS-1 Amine Synergist | FIRSTCURE AS-3 Amine Synergist | MDEA | Amine Acrylate C | Amine Functional Acrylate A | Amine Functional Acrylate B |
|---|---|---|---|---|---|---|---|
| Ebercyl 3720-TP25 | | 41.50 | 41.50 | 39.43 | 27.67 | 37.5 | 39.50 |
| Benzophenone | | 6.0 | 6.0 | 6.0 | 6.0 | 6.0 | 6.0 |
| FIRSTCURE HMPP photoinitiator | | 0.5 | 0.5 | 0.5 | 0.5 | 0.5 | 0.5 |
| DC-57 | | 0.5 | 0.5 | 0.5 | 0.5 | 0.5 | 0.5 |
| FC-430 | | 0.1 | 0.1 | 0.1 | 0.1 | 0.1 | 0.1 |
| MEHQ | | 0.02 | 0.02 | 0.02 | 0.02 | 0.02 | 0.02 |
| Monomer mix[1] (TMPEOTA and TRPGDA) | | 48.88 | 49.38 | 47.95 | 50.21 | 45.38 | 42.38 |
| Synergist | | 2.5 | 2.0 | 5.5 | 15.0 | 10.0 | 11.0 |
| Total weight | | 100.0 | 100.0 | 100.0 | 100.0 | 100.0 | 100.0 |
| Viscosity (cps) 25° C. | | 165 | 168 | 165 | 170 | 163 | 167 |

[1]The monomer mixture consisted of approximately 31.0% TMPEOTA and 69.0% TRPGDA, which was used in all formulations for constant monomer cost and diluency.

TABLE 5

| Evaluation Parameter | FIRSTCURE AS-1 Amine Synergist | MDEA | Amine Functional Acrylate A | Amine Functional Acrylate B | FIRSTCURE AS-3 Amine Synergist | Amime Acrylate C |
| --- | --- | --- | --- | --- | --- | --- |
| Blush | None | Severe | None | Slight | None | None |
| Pigment discoloration (reflex blue) | None | Severe fade | Moderate, spotty fade | Moderate, spotty fade | None | Slight, spotty discolor and fade |
| Pigment discoloration (rhodamine red) | None | Severe fade | Moderate, spotty fade | Slight spotty fade | None | Moderate fade |
| Solvent resistance (MEK double rubs) | 24 | 24 | 12 | 20 | 25 | 22 |
| Yellowness Index | 5.01 | 5.93 | 6.02 | 5.98 | 4.77 | 5.82 |
| Gloss (60°) | 95.7 | 96.1 | 95.1 | 96.5 | 96.0 | 95.7 |
| MEK extraction (% wt loss) | 7.52 | 7.69 | 10.38 | 12.62 | 4.55 | 5.29 |

Table 5 shows that FIRSTCURE AS-1 amine synergist is comparable to MDEA in every parameter tested, and outperforms MDEA in blush resistance. This performance of FIRSTCURE AS-1 amine synergist was attained using approximately half of the loading used for MDEA: only 2.5 wt % FIRSTCURE AS-1 amine synergist was used, versus 5.5 wt % for MDEA. Additionally, FIRSTCURE AS-1 amine synergist performs comparably to, or better than, amine functional acrylates A and B in chemical resistance, pigment discoloration, blush and yellowness. FIRSTCURE AS-1 amine synergist provides this level of performance at approximately one-fourth of the loading used for the amine functional acrylates A and B: 2.5 wt % for FIRSTCURE AS-1 amine synergist versus 10.0 wt % and 11.0 wt % for amine functional acrylates A and B. Since a relatively small percentage of FIRSTCURE AS-1 amine synergist is required, the remaining percentage can be substituted with a higher loading of oligomers to give better properties, or the monomer can be substituted with a lower cost one to reduce the cost of the final formulation.

Table 5 demonstrates that FIRSTCURE AS-3 amine synergist is comparable to or exceeds the performance of amine acrylate C. In each parameter evaluated, FIRSTCURE AS-3 amine synergist is comparable to or superior to amine acrylate C. This result was attained was attained at a fraction of the loading of amine acrylateC; 2.0 wt % FIRSTCURE AS-3 amine synergist versus 15.0 wt % of amine acrylate C. As in the case of FIRSTCURE AS-1 amine synergist, because a relatively small percentage of FIRSTCURE AS-3 amine synergist is required, the remaining percentage can be substituted with a higher loading of oligomers to give better properties, and the monomer can be substituted with a lower cost one to reduce the cost of the final formulation.

Compounds referred to by chemical name or formula anywhere in this document, whether referred to in the singular or plural, are identified as they exist prior to coming into contact with another substance referred to by chemical name or chemical type (e.g. another component, a solvent, or etc.). It matters not what preliminary chemical changes, if any, take place in the resulting mixture or solution, as such changes are the natural result of bringing the specified substances together under the conditions called for pursuant to this disclosure. Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

All documents referred to herein are incorporated herein by reference in toto as if fully set forth in this document.

The invention claimed is:

1. A photopolymerizable composition which comprises at least one photopolymerizable monomer, at least one photopolymerization initiator, and at least one long chain alkylamine which is (a) one or more of tetradecyldimethylamine, hexadecyldimethylamine, and octadecyldimethylamine, or (b) one or more trialkyl amines each having a total of 17 to about 38 carbon atoms in the molecule, and wherein one of the alkyl groups is methyl, and the other two alkyl groups are the same or different, and each is a primary alkyl group containing, independently, in the range of 8 to about 22 carbon atoms.

2. A composition as in claim 1 wherein said composition is devoid of any component having one or more free carboxyl groups.

3. A composition as in claim 1 wherein said photopolymerization initiator is one or more Type I photoinitiators.

4. A composition as in claim 1 wherein said photopolymerization initiator is one or more Type II photoinitiators.

5. A composition as in claim 1 wherein said one or more trialkylamines is didecylmethylamine.

6. A composition as in claim 1 further comprising at least one pigment, dye, or other color-producing substance whereby the composition is adapted for forming permanent printed, decorative, or pictorial matter on a substrate when applied thereto and photopolymerization in place.

7. A photopolymerized composition or article formed from a composition as in claim 1.

8. A photopolymerized composition or article as in claim 7 wherein said photopolymerized composition or article is an unwashed composition or article.

9. A photopolymerized composition or article as in claim 7 wherein said photopolymerized composition or article is in the form of a thin coating on paper or thin paperboard stock.

10. A photopolymerized composition or article as in claim 9 wherein said photopolymerized composition or article is an unwashed composition or article.

11. A method of forming a photopolymerized composition or article, which method comprises exposing a photopolymerizable composition as in claim 1 to sufficient radiation to photopolymerize said photopolymerizable composition.

12. A method as in claim 11 wherein the photopolymerization is effected using coherent radiation.

13. A method as in claim 11 wherein the photopolymerization is effected using non-coherent radiation.

14. A method as in claim 11 wherein said photopolymerizable composition is photopolymerized as a thin coating on a travelling web.

15. A method as in claim 11 wherein said photopolymerizable composition is photopolymerized as an a coating or laminate on a substrate.

16. A method as in claim 11 wherein said photopolymerizable composition is photopolymerized as an article or shape while in a mold.

17. A photopolymerizable composition which comprises at least one photopolymerizable monomer, at least one photopolymerization initiator, and at least one long chain alkylamine having (i) one or two methyl or ethyl groups and (ii) at least one alkyl group having a chain length of at least 8 carbon atoms, and further comprising at least one short chain tertiary amino compound containing at least two electronegative atoms in the molecule, at least one of which is a tertiary nitrogen atom and another of which is an oxygen atom or a tertiary nitrogen atom, and wherein the electronegative atoms are bonded only to short chain alkyl groups or to short chain alkylene groups, and wherein the compound has a total of at least 4 abstractable hydrogen atoms in positions alpha to at least some of the electronegative atoms in the compound, wherein said compound is N-[3-(dimethylamino)propyl]-N,N',N'-trimethyl-1,3-propanediamine, 2,2'-oxybis[N,N -dimethylethanamine], N,N-dimethyl-4-morpholineethanamine, and wherein said composition further comprises 2-hydroxy-2-methyl-1-phenylpropane-1-one.

18. A composition as in claim 17 wherein said compound has a total of at least 6 abstractable hydrogen atoms in positions alpha to at least some of the electronegative atoms in the compound.

19. A composition as in claim 17 wherein when said compound is N,N-dimethyl-4-morpholineethanamine, said long chain amine is dodecyldimethyl amine.

20. A photopolymerized composition or article formed from a composition as in claim 17.

21. A method of (A) minimizing blushing, discoloration and premature degradation of a polymer formed by the photopolymerization of a photopolymerizable composition which comprises at least one photopolymerizable monomer, and at least one Type I photopolymerization initiator, or (B) eliminating or minimizing extractables, discoloration, and premature degradation of a film having a thickness of 2 mils or less where said film is formed by the photopolymerization of a photopolymerizable composition which comprises at least one photopolymerizable monomer, and at least one Type II photopolymerization initiator, said method characterized by including in the composition of (A) or of (B) before photopolymerization, at least one long chain alkylamine which is tetradecyldimethylamine, hexadecyldimethylamine, octadecyldimethylamine, or didecylmethylamine.

22. A method as in claim 21 wherein said method is the method of (A).

23. A method as in claim 21 wherein said method is the method of (B).

* * * * *